June 26, 1945.  C. H. MERRITT  2,379,314
CURRENT MOTOR
Filed Aug. 19, 1942   3 Sheets-Sheet 1

INVENTOR
Charles H. Merritt
BY
ATTORNEY

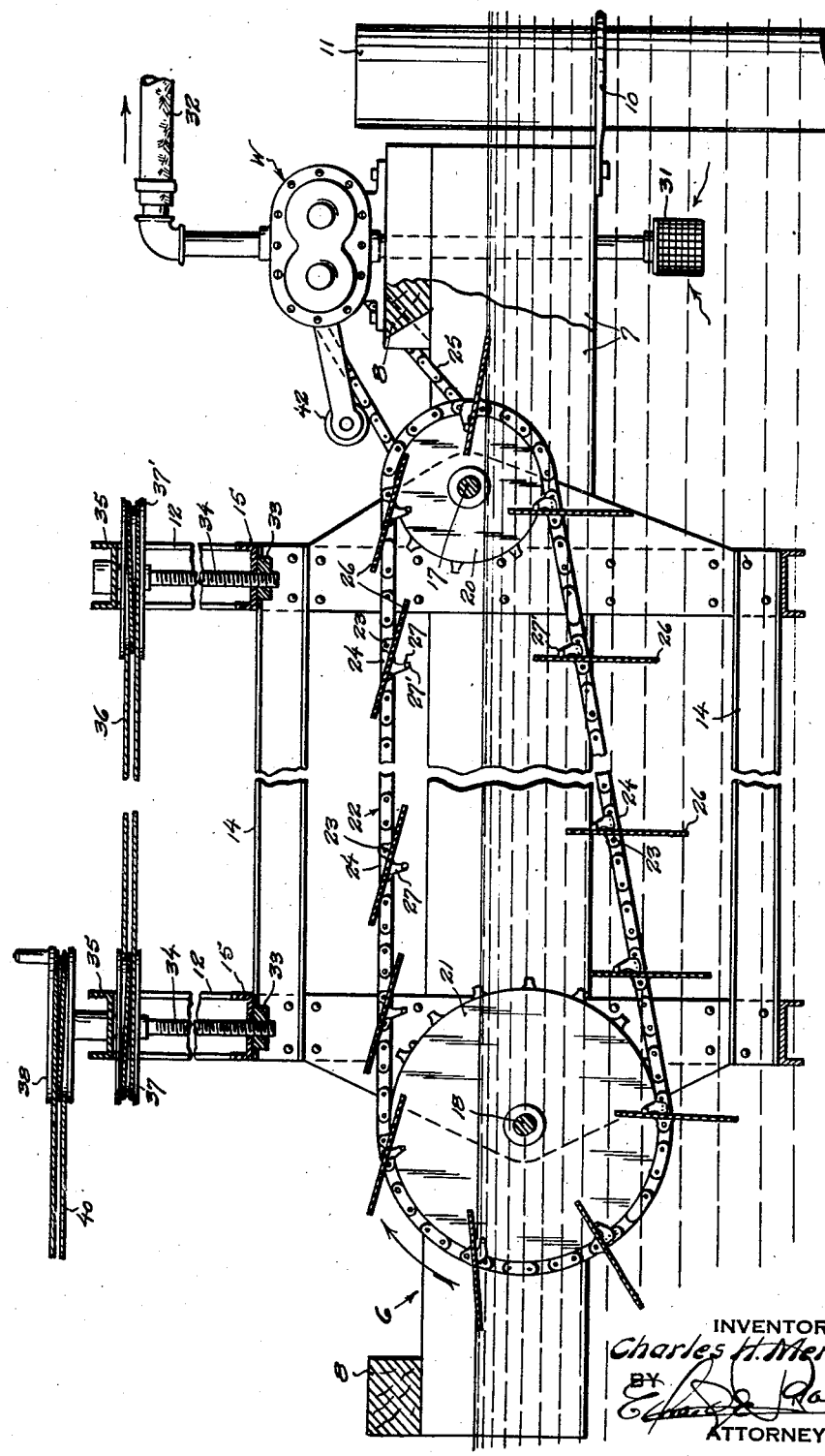

June 26, 1945.  C. H. MERRITT  2,379,314
CURRENT MOTOR
Filed Aug. 19, 1942    3 Sheets-Sheet 3
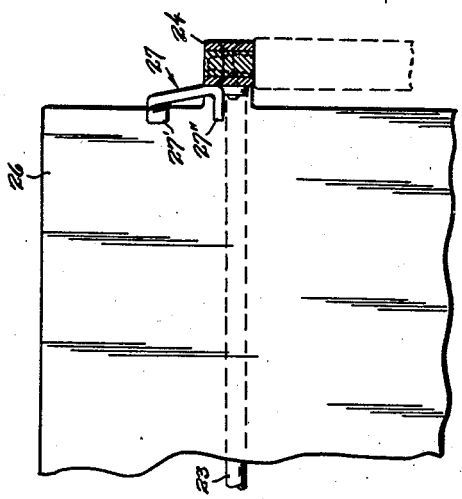
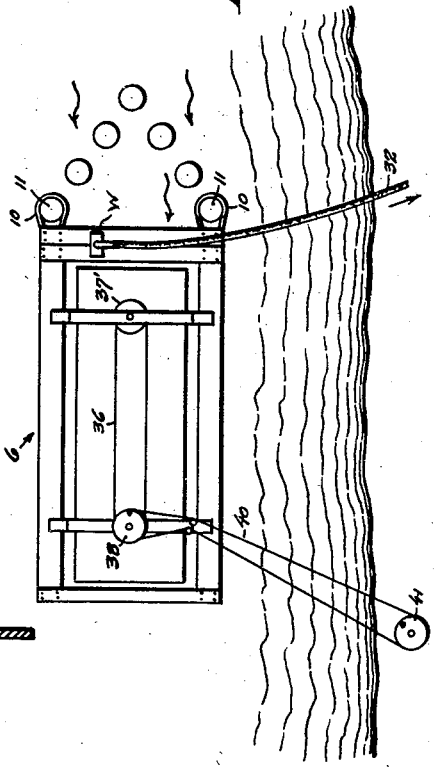
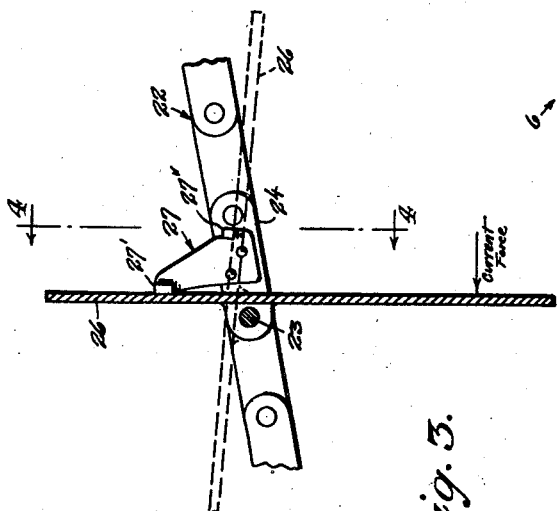
INVENTOR
Charles H. Merritt
ATTORNEY Patented June 26, 1945

2,379,314

UNITED STATES PATENT OFFICE 2,379,314

CURRENT MOTOR

Charles H. Merritt, Bellingham, Wash., assignor to Guy J. Pepper, Bellingham, Wash.

Application August 19, 1942, Serial No. 455,395

2 Claims. (Cl. 170—85)

This invention relates to current motors, and has for its principal object to provide an especially efficient motor mechanism adapted to be installed in a stream, irrigation ditch or other flowing body of water to receive a driving impulse from the current energy.

It is a further object of the invention to provide a current motor employing an improved form of water wheel embodying advanced capabilities and which is rendered particularly efficient by an ability to minimize the resistance encountered by the exposed blades from opposingly directed surface winds.

As a still further object enlarging on the advanced working efficiency, the invention contemplates the provision of a current motor embodying an endless chain supported by longitudinally spaced sprocket wheels and itself supporting a plurality of impeller blades mounted at longitudinally spaced intervals, and which said wheel-chain-blade assembly is so engineered as to cause the blades, in the working travel thereof, to submerge to progressively greater depths correspondingly with the movement from the leading to the down-stream sprocket wheel whereby, through the stepped relation of the blades, to provide an exposure of each blade to the flowing body of water.

As a still further object, the invention aims to provide a current motor employing novel control devices for governing the power output of the same by the instrumentality of regulating the water wheel for depth of submergence, such devices, more especially, being so applied as to permit the blades of the water wheel to be adjusted for depth of submergence from a point located upon the shore of the stream and in consequence remote from the current motor which, in the usual installation, would be applied in the middle of the stream.

The invention has for a further object to devise a relatively inexpensive and comparatively simple current motor, a motor which is of compact and especially sturdy construction, and one which generally is more efficient from the standpoint of serviceability and operation than motors heretofore developed for a like usage.

The present invention is an improvement over that shown and claimed in my prior abandoned application filed July 26, 1932, Ser. No. 624,698.

Visualizing the objective aims above recited and having additional more particular objects and advantages in view which will fully appear and be understood in the course of the following description and claims, the invention consists in the novel construction and in the adaptation and combination of parts hereinafter described and claimed.

In the accompanying drawings:

Fig. 2 is a longitudinal vertical section on line 2—2 of Fig. 1.

Fig. 3 is an enlarged longitudinal vertical section detailing one of the impeller blades and the supporting chain-link structure.

Fig. 4 is a transverse vertical section on line 4—4 of Fig. 3; and

Fig. 5 is a schematic plan view taken to a reduced scale to illustrate the manner of applying the motor in one of several possible applications.

Figure 1:
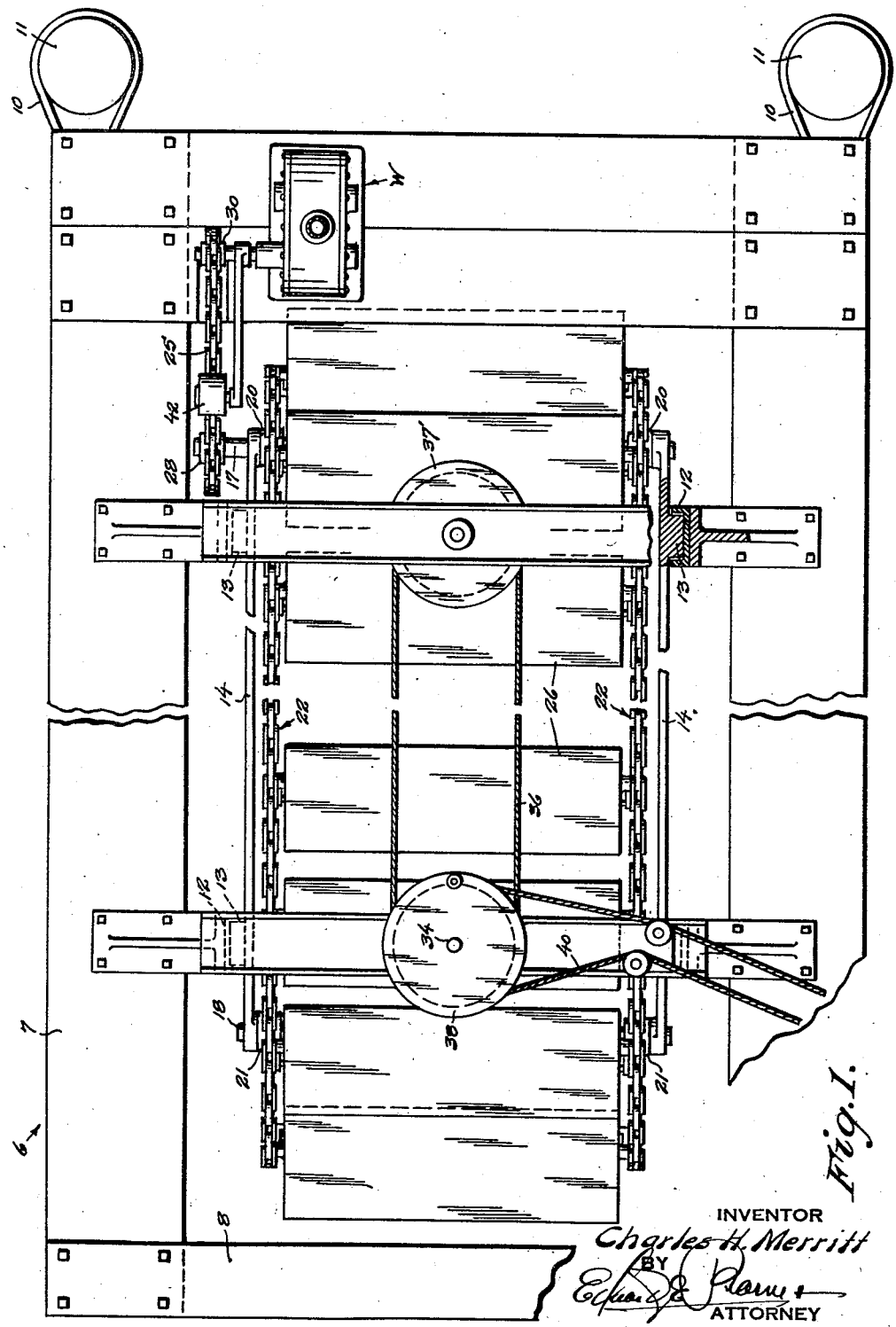
Figure 1 is a top plan view indicating a current motor constructed in accordance with the now preferred embodiment of the invention, the remote-control cable and a hose leading to the shore of the stream being shown fragmentarily.

Having reference to the drawings, the numeral 6 generally denotes a float formed of laterally spaced side timbers 7 connected by cross-planks 8 at the ends. A platform may be provided at one extremity as a foundation bed for a work unit such, for example, as the indicated rotary water pump represented by the letter W. As a mooring permitting a rise and fall of the float in correspondence with changing levels of the stream I employ straps 10 passed from the bow end of the float about end members 11 of a series of piles which, as illustrated in Fig. 5, are preferably driven into the bed of the stream in a wedge formation to act as a shear-bumper in deflecting floating matter such as logs or the like from the impeller blades of the motor.

Boltably fixed to the side timbers at the two ends of the float are upright channel members 12 which serve as guides for slide elements 13 carried fore and aft at each side of a motor frame indicated as being comprised of cheek plates connected top and bottom by longitudinal stringers 14, the stringers in turn being coupled transversely by cross-pieces 15. Designated at 17 and 18 are longitudinally spaced and transversely extending horizontal shafts journaled in the motor frame, and fixed to the shafts are sprocket wheels 20 and 21, there being two sprocket wheels for each shaft aligned longitudinally with a complementary sprocket wheel of the other shaft. Received over the sprocket wheels are companion endless chains 22. In the preferred construction the down-stream sprocket wheels are diametrically enlarged from the forward sprocket wheels and are located with the axis either lying below or in a plane common to the horizontal plane of the forward axis, the former of such arrangements being the desirable construction and the spacing being such as to have the return level of the chain occupy a horizontal plane.

The chains, at spaced intervals of the lengths, are fitted with special links arranged to form journals for transverse rods 23 to which are secured the impeller blades 26 of the motor. I attach the blades to have the rods, which form a rocker axis, lie in off-set relation to the longitudinal median line and with the greater width of the blade lying exteriorly of the chain, and there is provided, riveted to each such supporting link or produced integral therewith, a bracket 27 presenting inturned lugs 27' and 27" functional to the blades and serving as oppositely acting stops to govern the rocker action of the shafts, one of such stops being so located as to position the related blade, at one extreme of its wrist movement, at substantial right angles to the chain or in such slightly modified relation as to have the chain lie perpendicularly when submerged and the other stop to position the blade, in the other extreme of its wrist movement, in relative alignment with the chain but somewhat short of a true feathering. From the foregoing it is believed to be apparent that the blades, in their passage about the downstream sprocket wheels, moving from a lower to an upper level are caused by force of gravity to pivotally swing into their feathering positions, and that a following movement about the forward sprocket wheels moving from the upper to the lower level operates through the force of gravity complemented by the energy of the impacting stream to cause the blades to revert to an operating position. Also believed to be clear from the description is the fact of each preceding blade occupying a position stepped below the following blade with a consequent exposure of each of the working blades to the force of the current body.

25 designates a power chain extending from a take-off sprocket wheel 29 fixedly carried upon the up-stream shaft to a complementing sprocket wheel 30 mounted upon the drive shaft of the work unit W which, as indicated, is provided with a screened induction pipe 31 and has connection from its eduction side with a flexible hose 32 arranged to feed to an elevated storage tank suitable for irrigation or such other purpose as might be desired. It is considered obvious that the motor—by which I mean my water motor—might as well be applied for the generation of electric power or other desired work.

Reverting to the slide elements 13 having the function of accommodating vertical movement of the motor frame relative to the supporting float, it will be seen that I provide at each end of the motor frame and fixedly related thereto the nuts 33 serving a travelling office upon vertical low-pitch jack-screws 34 which are thrust and journal mounted in head brackets 35 of the float structure. Fast to the jack-screws and receiving an endless cable 36 for obtaining unitary movement as between the two ends of the motor frame are pulleys 37—37', and also provided upon one of the screws is a second pulley 38 operated by an endless cable 40 leading to the shore of the stream whereat the same is carried about a complementing governing pulley 41 (Fig. 5). Represented at 42 is a weighted idler compensating for vertical movement of the motor frame and which is pivotally carried in co-axial relation to the sprocket wheel 30, riding upon the chain 25 for taking up slack.

The operation is believed to be clear, the blades being readily regulated for depth of submergence through the instrumentality of the remote-control cable 40 and, where the desire or need might arise, elevated completely out of the water with a responsive suspension of the power development. It will be apparent that a fixed support might be substituted for the float where the water wheel is installed in an irrigation ditch or other current source maintaining a constant water level.

Numerous departures from the illustrated and described preferred embodiment will readily suggest themselves, and I accordingly intend that the hereto annexed claims be read with only such limitations as are expressly introduced thereto in distinguishing from prior knowledge in the art.

What I claim is:

1. A current motor comprising, in combination with a motor frame, longitudinally spaced transverse shafts journaled in the frame, laterally spaced sprocket wheels fixedly mounted upon each of the shafts, and longitudinally extending endless chains passing about the sprocket wheels; impeller blades carried at longitudinally spaced intervals by the chains and pivotally mounted for wrist movements about an axis offset from the blade's longitudinal median line to have the greater width lie exteriorly of the chain; chain-carried stops acting to limit gravity-influenced pivoting of the blades, as the same carry about the rear sprocket wheels in their travel from the chain's lower to the chain's upper level, such that the blades occupy positions somewhat short of a true feathering; and complementary chain-carried stops acting as the blades carry about the forward sprocket wheels in the travel from the upper to the lower level to limit gravity-influenced pivoting such that the blades revert to operating positions exposed to the force of the current flow.

2. In a current motor adapted to be supported in the approximate center of a stream to be influenced by the maximum stream current: the combination of a float; a non-floatative motor frame slidably supported for vertical movement by the float; a motor carried by the frame and including longitudinally spaced transverse shafts journaled in the frame, sprocket wheels fixed to the shafts, an endless chain received over said sprocket wheels, and impeller blades supported by the chain to lie at spaced intervals of the chain's length to bring the latter, in the lower-level travel of the chain from the forward to the rear sprocket wheel, under the driving influence of the stream current; a stationary work unit carried by the float; connection between the current-driven endless chain and the work unit comprising a second endless chain; remote-control devices arranged to be operated from the shore of the stream and having operative connection with the motor frame for adjusting the latter vertically in relation to the float; and a self-adjusting weighted idler arranged to engage said second-named chain at a point intermediate the driven and driving ends for maintaining the chain taut as the frame is raised or lowered relative to the float, said self-adjustment acting in conjunction with the remote-control devices to permit regulation of the motor without access to the float.

CHARLES H. MERRITT.